(12) United States Patent
Scalabrino et al.

(10) Patent No.: US 10,732,980 B2
(45) Date of Patent: Aug. 4, 2020

(54) APPARATUS AND METHOD FOR CONTROLLING USE OF A REGISTER CACHE

(71) Applicant: ARM Limited, Cambridge (GB)

(72) Inventors: Luca Scalabrino, Villeneuve Loubet (FR); Frederic Jean Denis Arsanto, Le Rouret (FR); Claire Aupetit, Antibes (FR)

(73) Assignee: ARM Limited, Cambridge (GB)

( * ) Notice: Subject to any disclaimer, the term of this patent is extended or adjusted under 35 U.S.C. 154(b) by 70 days.

(21) Appl. No.: 16/018,492

(22) Filed: Jun. 26, 2018

(65) Prior Publication Data
US 2019/0012177 A1    Jan. 10, 2019

(30) Foreign Application Priority Data

Jul. 4, 2017   (GB) .................................. 1710732.7

(51) Int. Cl.
*G06F 9/34* (2018.01)
*G06F 12/08* (2016.01)
(Continued)

(52) U.S. Cl.
CPC ........ *G06F 9/3844* (2013.01); *G06F 9/30047* (2013.01); *G06F 9/30138* (2013.01);
(Continued)

(58) Field of Classification Search
CPC ............... G06F 9/3844; G06F 9/30047; G06F 9/30183; G06F 9/30145; G06F 9/3814;
(Continued)

(56) References Cited

U.S. PATENT DOCUMENTS 6,289,417 B1 * 9/2001 Larri ................... G06F 9/30138
711/118
2004/0225838 A1   11/2004 Biles
(Continued)

OTHER PUBLICATIONS

Combined Search and Examination Report for GB 1710732.7, dated Dec. 22, 2017, 4 pages.
(Continued)

*Primary Examiner* — Daniel H Pan
(74) *Attorney, Agent, or Firm* — Nixon & Vanderyhe P.C.

(57) ABSTRACT

An apparatus and method are provided for controlling use of a register cache. The apparatus has decode circuitry for decoding instructions retrieved from memory, execution circuitry to execute the decoded instructions in order to perform operations on data values, and a register file having a plurality of registers for storing the data values to be operated on by the execution circuitry. Further, a register cache is provided that comprises a plurality of entries, and is arranged to cache a subset of the data values. Each entry is arranged to cache a data value and an indication of the register associated with that cached data value. Prefetch circuitry is then used to prefetch data values from the register file into the register cache. Further, operand analysis circuitry derives source operand information for an instruction fetched from memory, at least prior to the decode circuitry completing decoding of that instruction. It then causes provision to the prefetch circuitry of at least one register identifier determined from the source operand information. The prefetch circuitry then utilises that at least one register identifier when determining which data values to prefetch into the register cache. Such an approach can significantly increase the hit rate within the register cache, hence improving performance.

16 Claims, 11 Drawing Sheets

(51) Int. Cl.
  *G06F 9/38* (2018.01)
  *G06F 9/30* (2018.01)
  *G06F 12/0862* (2016.01)

(52) U.S. Cl.
  CPC .......... *G06F 9/30145* (2013.01); *G06F 9/384* (2013.01); *G06F 9/3814* (2013.01); *G06F 9/382* (2013.01); *G06F 9/383* (2013.01); *G06F 9/3826* (2013.01); *G06F 12/0862* (2013.01)

(58) Field of Classification Search
  CPC ........ G06F 9/384; G06F 9/382; G06F 9/3824; G06F 9/3826; G06F 9/383; G06F 9/3832; G06F 9/3861; G06F 9/386; G06F 12/0862; G06F 9/3863; G06F 9/30043
  USPC .................. 712/213, 220, 207; 711/137, 213
  See application file for complete search history.

(56) References Cited

U.S. PATENT DOCUMENTS

| | | | | |
|---|---|---|---|---|
| 2005/0138297 | A1* | 6/2005 | Sodani | G06F 9/30138 |
| | | | | 711/143 |
| 2005/0278505 | A1* | 12/2005 | Lim | G06F 5/01 |
| | | | | 712/207 |
| 2015/0058572 | A1* | 2/2015 | Olson | G06F 9/30043 |
| | | | | 711/125 |

OTHER PUBLICATIONS

Shioya et al., "Register Cache System not for Latency Reduction Purpose", Micro '43 Proceedings of the 2010 43$^{rd}$ Annual IEEE/ACM International Symposium on Microarchitecture, Dec. 4-8, 2010, pp. 301-312.

* cited by examiner

APPARATUS AND METHOD FOR CONTROLLING USE OF A REGISTER CACHE

This application claims priority to 1710732.7 filed 4 Jul. 2017, the entire contents of which is hereby incorporated by reference.

BACKGROUND

The present technique relates to an apparatus and method for controlling use of a register cache.

As data processing systems increase in complexity, the size of the register file (also known as a register bank) accessible to a processor has significantly increased. Modern day processors may implement a variety of different mechanisms aimed at increasing throughput, and may for example allow multiple instructions to be executed simultaneously using different execution pipelines. Register renaming techniques may be used to increase the ability to parallelise instruction execution. This has led to an overall increase in the number or registers provided by the register file, and also has tended to lead to an increase in the number of read and write ports provided for the register file.

As the register file increases in size and complexity, the time taken to access the register file can become significant, and potentially place a timing limitation on the performance of the processor.

One proposal to seek to alleviate the timing constraint resulting from access to the register file is to use a register cache to cache a subset of the data held in the register file. The processor can then attempt to access the required data in the register cache, and only in the event that the data is not in the register cache will an access to the register file be required. In order to improve the benefits available from such an approach, it is desirable to reduce the occurrence of misses within the register cache.

SUMMARY

In one example configuration, there is provided an apparatus comprising: decode circuitry to decode instructions retrieved from memory; execution circuitry to execute the decoded instructions in order to perform operations on data values; a register file comprising a plurality of registers to store the data values to be operated on by the execution circuitry; a register cache comprising a plurality of entries and arranged to cache a subset of the data values, each entry arranged to cache a data value and an indication of the register associated with that cached data value; prefetch circuitry to prefetch data values from the register file into the register cache; and operand analysis circuitry to derive source operand information for an instruction fetched from the memory, at least prior to the decode circuitry completing decoding of that instruction, and to cause provision to the prefetch circuitry of at least one register identifier determined from said source operand information; wherein the prefetch circuitry is arranged to utilise the at least one register identifier when determining which data values to prefetch into the register cache.

In another example configuration, there is provided a method of operating an apparatus having decode circuitry for decoding instructions retrieved from memory, execution circuitry for executing the decoded instructions in order to perform operations on data values, and a register file comprising a plurality of registers to store the data values to be operated on by the execution circuitry, the method comprising: providing a register cache comprising a plurality of entries and arranged to cache a subset of the data values, each entry arranged to cache a data value and an indication of the register associated with that cached data value; employing prefetch circuitry to prefetch data values from the register file into the register cache; deriving source operand information for an instruction fetched from the memory, at least prior to the decode circuitry completing decoding of that instruction; providing to the prefetch circuitry at least one register identifier determined from said source operand information; and causing the prefetch circuitry to utilise the at least one register identifier when determining which data values to prefetch into the register cache.

In a yet further example configuration, there is provided an apparatus comprising: decode means for decoding instructions retrieved from memory; execution means for executing the decoded instructions in order to perform operations on data values; register file means comprising a plurality of registers for storing the data values to be operated on by the execution means; a register cache means for providing a plurality of entries and for caching a subset of the data values, each entry arranged to cache a data value and an indication of the register associated with that cached data value; prefetch means for prefetching data values from the register file means into the register cache means; and operand analysis means for deriving source operand information for an instruction fetched from the memory, at least prior to the decode means completing decoding of that instruction, and for causing provision to the prefetch means of at least one register identifier determined from said source operand information; wherein the prefetch means is arranged to utilise the at least one register identifier when determining which data values to prefetch into the register cache means.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
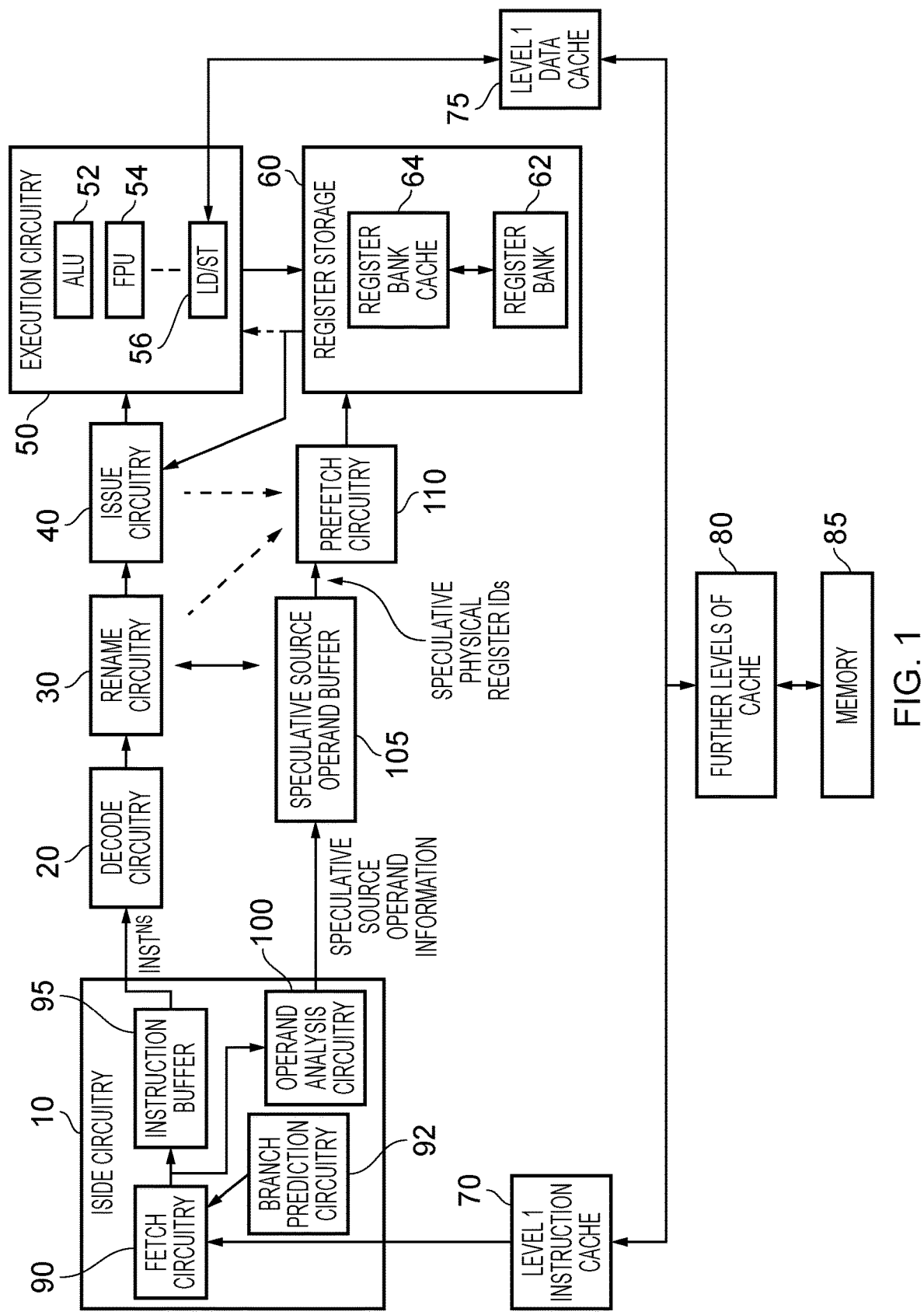
FIG. 1 is a block diagram of an apparatus of one example arrangement.

Before discussing examples with reference to the accompanying figures, the following description of examples is provided.

In one embodiment, an apparatus is provided that has decode circuitry to decode instructions retrieved from memory, and execution circuitry to execute the decoded instructions in order to perform operations on data values. A register file is provided that comprises a plurality of registers to store the data values to be operated on by the execution circuitry. In addition, a register cache is provided comprising a plurality of entries, the register cache being arranged to cache a subset of the data values, with each entry being used to cache a data value and an indication of the register associated with that cached data value.

The embodiments described herein seek to provide a mechanism to increase the likelihood that data values required by execution circuitry will be present in the register cache by the time they are needed by the execution circuitry. In particular, prefetch circuitry is provided to prefetch data values from the register file into the register cache. Operand analysis circuitry is then provided in one embodiment to derive source operand information for an instruction fetched from memory, this source operand information being derived at least before the decode circuitry has completed decoding the instruction, and hence before the execution circuitry will have begun executing that instruction. The operand analysis circuitry then causes provision to the prefetch circuitry of at least one register identifier determined from the source operand information. The prefetch circuitry is then arranged to utilise the at least one register identifier when determining which data values to prefetch into the register cache.

By such a mechanism, an early indication can be provided of registers that contain data values that are likely to be needed as source operands for instructions that will be executed in the future, and the prefetch circuitry can then take steps to prefetch the contents of such registers into the register cache with the aim that that information will then reside in the register cache by the time the execution circuitry subsequently executes the instruction, thereby reducing the likelihood of cache misses occurring within the register cache. By such an approach, it is possible to significantly improve the efficiency of use of the register cache, thereby enabling performance improvements to be realised.

There are a number of ways in which the register cache and register file may be used during operation of the apparatus. However, in one embodiment, when the execution circuitry is to execute a decoded instruction, the register cache is arranged to perform a lookup operation in response to a register identifier identifying a data value required by the execution circuitry, such that the required data value is retrieved from the register cache rather than the register file when that data value is cached within the register cache. Since the register cache only stores a subset of the data values that may be held within the register file, it will typically be significantly quicker to access the register cache than the register file, and hence it is desirable to preferentially access the required data from the register cache when the register cache contains that required data.

The point at which the operand analysis circuitry reviews instructions fetched from memory may vary dependent on embodiment. However, in one embodiment, the apparatus further comprises fetch circuitry to speculatively fetch instructions from the memory in anticipation of those instructions being required to be executed by the execution circuitry, and the operand analysis circuitry may be arranged to derive the source operand information from at least one of the speculatively fetched instructions. Hence, in such an embodiment, the operand analysis circuitry can be arranged to review the instructions even before it is known whether those instructions will actually be executed by the execution circuitry, for example due to the taken/not taken behaviour of preceding branch instructions not yet being known. However, by analysing the instructions at this early stage, it is possible to provide useful guidance to the prefetch circuitry as to the registers that are likely to be required by upcoming instruction execution, and hence provide the prefetch circuitry with time to prefetch the data values from those registers into the register cache in anticipation of them being required in due course by the execution circuitry.

Whilst the prefetching on such a basis is somewhat speculative, the speculation will typically provide a reasonably accurate indication of the operands that are likely to be required during future instruction execution, and hence it has been found that such an approach can significantly increase the hit rate within the register cache. It is to be noted that in the event that the above described mechanism results in a data value being prefetched into the register cache that is not in fact later required, due for example to the relevant instruction not in fact being executed, this does not give rise to any erroneous operation, but merely means that an unnecessary prefetch has taken place. The occasional occurrence of such a scenario is far outweighed by the performance benefits that can be realised by prefetching data values into the register cache on the basis of the register identifiers determined using the operand analysis circuitry described above.

The operation of the operand analysis circuitry can vary dependent on embodiment, and may depend on the amount of information derivable from the instructions at the time they are analysed by the operand analysis circuitry. For example, it is often the case that some partial decode of instructions occurs at a very early stage after they are fetched from memory, and prior to the full decode operation being performed, and any such partial decode information can be made available to the operand analysis circuitry. For example, such information may enable the operand analysis circuitry to identify whether the instruction under consideration is of one or more types of instruction that the operand analysis circuitry will derive source operand information for. Hence, if the instruction is an instruction from those one or more types, the operand analysis circuitry can be arranged to derive the source operand information for that instruction, whereas otherwise it may be arranged in one embodiment to ignore the instruction, and hence not derive any source operand information for that instruction. This can be useful since certain types of instructions may not in fact have a source operand that is specified with reference to a register, and hence when that instruction is later executed there will be no need to seek to obtain a source operand from the register cache. An example may be for instance one or more types of load instruction, which will seek to fetch data from a memory address and load it into one of the registers (the identified register in this case being used as a destination in which to store the result, rather than as a source from which to obtain source data for the operation). As another example, a direct branch instruction may typically not require any source register content. If there is sufficient information available to the operand analysis circuitry at the time an instruction is analysed to determine whether that instruction is of a type that will not consume the content of a register as a source operand, then the operand analysis circuitry can choose to perform no further analysis of that instruction.

Once the operand analysis circuitry has determined that source operand information should be derived for an instruction currently being considered, then there are a number of ways in which the source operand information can be derived from the instruction. In one embodiment, the operand analysis circuitry is arranged, for each of the at least one speculatively fetched instructions, to derive the source operand information from a determined sequence of bits of the speculatively fetched instruction. How the sequence of bits is determined may vary, dependent for example on the amount of information available to the operand analysis circuitry about the instruction being considered. For example, the operand analysis circuitry may have enough information to know which bits of the instruction contain the source operand information, and accordingly will consider that exact sequence of bits. Otherwise, an assumption may need to be made about the bits within the instruction that contain the source operand information, with the determined sequence of bits being chosen accordingly. For example, in certain instruction set architectures, there may be a great degree of consistency as to which bits within an instruction contain the source operand information, and accordingly those bits can be considered as a default, unless additional more specific information about the instruction dictates that a different sequence of bits should be considered. For instance, if the operand analysis circuitry knows the type of the instruction being considered, that type information may be used to influence which bits are reviewed in order to derive the source operand information.

The manner in which the prefetch circuitry uses each register identifier provided to it via the operand analysis circuitry can vary dependent on embodiment. However, in one embodiment, unless an override condition exists, the prefetch circuitry is arranged to be responsive to each register identifier provided via the operand analysis circuitry to load into the register cache the data currently stored in the identified register of the register file. Hence, the default action is for the prefetch circuitry to prefetch the data from the identified register into the register cache. However, this default action can be overridden for a variety of reasons. For example, when the apparatus is in certain modes of operation, the above described activity of the prefetch circuitry may be overridden, so that it then ignores any information provided by the operand analysis circuitry. This behaviour could alternatively be configured under software control.

As another example of an override condition, the override condition may be determined to exist when an entry in the register cache already stores up-to-date data for the identified register. In particular, when the prefetch circuitry receives a register identifier via the operand analysis circuitry, it may first perform a lookup within the register cache to check whether the up-to-date content for that identified register is already present within the register cache, since if so no further action is required. In such an arrangement, if that lookup resulted in a miss then the prefetch circuitry would perform the prefetch operation in order to load into the register cache the current content of the identified register of the register file.

The override condition can also occur due to other situations. For example, the prefetch circuitry may be arranged to receive prefetch requests from at least one component associated with instruction execution, in addition to the register identifiers that it receives via the operand analysis circuitry. Since the source of such prefetch requests are components that are associated with instruction execution, they may be considered to be of higher priority than the register identifier information provided via the operand analysis circuitry, which as discussed earlier may be more speculative in nature. As a result, in one embodiment the override condition may be determined to exist when an asserted prefetch request is received from said at least one component. As a result, the prefetch circuitry will then process the asserted prefetch request received from the at least one component in preference to a register identifier provided via the operand analysis circuitry. In due course, once there are no longer any such asserted prefetch requests from the at least one component, the prefetch circuitry can return to processing the register identifiers received via the operand analysis circuitry.

The at least one component associated with instruction execution can take a variety of forms, but in one embodiment comprises issue circuitry used to maintain a list of decoded instructions awaiting execution by the execution circuitry, and/or rename circuitry used to map architectural registers specified by instructions to registers within the register file. Since these components are processing instructions that will actually be executed, the prefetch circuitry can be arranged to give precedence to the prefetch requests issued by such components.

In one embodiment, the reason why the register file may be relatively large is because a renaming scheme is employed within the apparatus. In particular, the number of registers in the register file may exceed the number of architectural registers specifiable by the instructions. This enables for example the same architectural register specified by two different instructions to be mapped to different physical registers within the register file, so as to remove some false dependencies that would otherwise prevent parallelisation of those instructions.

In particular, rename circuitry can be provided to map the architectural register specified by the decoded instructions to registers within the register file. As a result, when the decoded instructions are executed by the execution circuitry, data values are accessed using the register identifiers determined by the rename circuitry. In one such embodiment, the source operand information derived by the operand analysis circuitry may provide an indication of at least one architectural register, and the operand analysis circuitry may be arranged to cause the rename circuitry to be referenced in order to determine the corresponding at least one register identifier to be provided to the prefetch circuitry.

Whilst in one embodiment the operand analysis circuitry may directly provide to the prefetch circuitry the at least one register identifier, in an alternative embodiment the apparatus further comprises a buffer provided in association with the operand analysis circuitry to store the register identifiers determined from the source operand information of multiple instructions fetched from the memory. The prefetch circuitry may then be arranged to access the buffer when determining which data values to prefetch into the register cache. Hence, this enables multiple register identifiers to be buffered for reference by the prefetch circuitry as and when the prefetch circuitry has available capacity to process them.

In one embodiment where the earlier-mentioned rename circuitry is used, the operand analysis circuitry may be arranged to place the derived source operand information in the buffer, and the rename circuitry may then be arranged to update the buffer with corresponding register identifiers. In particular, in one embodiment, the source operand information placed into the buffer by the operand analysis circuitry can be used to trigger a lookup within the rename circuitry to replace the source operand information (which may be indicative of an architectural register) with the corresponding register identifier indicative of a physical register within the register file.

In one embodiment, on detection of at least one condition, the operand analysis circuitry may be arranged to omit storing in the buffer an item of derived source operand information. The at least one condition can take a variety of forms. For example, the at least one condition may comprise detection that the item of derived source operand information indicates an architectural register that is specified as a destination operand for a pending write operation. In that instance, it may be considered not appropriate to trigger any prefetching of register content into the register cache, since the required data value will in fact in due course be produced by the pending write operation. Hence, it will not be the current content of the register that is used, but instead the result subsequently produced by the pending write operation, and hence prefetching the current content of the register may not serve a useful purpose.

In an alternative embodiment, status information may be generated for storage in the buffer in association with each register identifier provided by the rename circuitry, and the prefetch circuitry may be arranged to reference the status information when determining what action to take in respect of each register identifier in the buffer. This status information can take a variety of forms, but can be used to influence the steps taken by the prefetch circuitry when considering the register identifier.

For example, when the status information has a first value, the prefetch circuitry may be arranged, unless an override condition exists, to load into the register cache the data currently stored in the register of the register file that is indicated by the register identifier. The override condition may be any of the example override conditions discussed earlier.

However, if instead the status information has a second value, the prefetch circuitry may be arranged in one embodiment to identify to register cache access circuitry that, when the execution circuitry generates a result data value for storing in the register indicated by the register identifier, said result data value is to be stored in the register cache. In particular, the fact that the status information has the second value may indicate that the register referenced by the register identifier is a register that will be used as a destination for a pending write operation, and in that case it may be considered appropriate for the prefetch circuitry not to prefetch the current contents into the register cache, but instead to issue a control signal to ensure that when the result data value is subsequently produced by the execution circuitry, that result data value is stored in the register cache. It may be stored in the register cache instead of storing the result in the relevant register of the register file, or alternatively may be stored in the register cache in addition to storing the result value in the identified register of the register cache.

Particular examples will now be described with reference to the Figures.

FIG. 1 is a block diagram of an apparatus in one example arrangement. The apparatus includes instruction side (ISIDE) circuitry 10 whose primary purpose is to retrieve instructions from memory 85 for provision to decode circuitry 20. Typically one or more levels of cache will be provided between the ISIDE circuitry 10 and the memory 85, for example the level one instruction cache 70 shown in FIG. 1, and one or more further levels of cache 80.

The apparatus includes processing circuitry that is arranged as a processing pipeline to process the instructions fetched from memory. In this example, the processing pipeline includes a number of pipeline stages including a decode stage implemented by the decode circuitry 20, a rename stage implemented by the renaming circuitry 30, an issue stage implemented by the issue circuitry 40, and an execute stage implemented by the execution circuitry 50.

The ISIDE circuitry 10 may include fetch circuitry 90 which will be arranged to fetch instructions from the memory by issuing requests to the level one instruction cache 70. The fetch circuitry may usually fetch instructions sequentially from successive instruction addresses. However, the fetch circuitry may also have access to a branch prediction circuitry 92 for predicting the outcome of branch instructions, and in such cases the fetch circuitry can fetch instructions from a (non-sequential) branch target address if the branch is predicted taken, or from the next sequential address if the branch is predicted not taken. The branch predictor may include one or more branch history tables for storing information for predicting whether certain branches are likely to be taken or not. For example, the branch history tables may include counters for tracking the actual outcomes of previously executed branches or representing confidence in predictions made for branches. The branch prediction circuitry may also have access to a branch target address cache (BTAC) for caching previous target addresses of branch instructions so that these can be predicted on subsequent encounters of the same branch instructions.

The fetched instructions may be placed in an instruction buffer 95, from where they are passed to the decode circuitry 20 which decodes the instructions to generate decoded instructions. The decoded instructions may comprise control information for controlling the execution circuitry 50 to perform the appropriate processing operations. For some complex instructions fetched from memory, the decode circuitry 20 may map those instructions to multiple decoded instructions, which may be known as micro-operations (µops or uops). Hence, there may not be a one-to-one relationship between the instructions fetched from the level one instruction cache 70 and instructions as seen by later stages of the pipeline. In general, references to "instructions" in the present application should be interpreted as including micro-operations.

In the example arrangement shown in FIG. 1, the decoded instructions are passed to rename circuitry 30 which maps the architectural registers specified by the instructions to physical registers within the register bank 62 of the register storage 60. Register renaming is a technique that can be used to eliminate false data dependencies arising from the re-use of architectural registers by successive instructions that do not have any real data dependencies between them. As is well understood by those skilled in the art, the elimination of these false data dependencies reveals more instruction-level parallelism in an instruction stream, which can then be exploited by various and complementary techniques such as superscalar and out-of-order execution in order to increase performance.

Hence, for any source or destination operands specified in an instruction by reference to architectural registers, the rename circuitry 30 may map those architectural registers to corresponding physical registers within the register bank 62, so that in due course when the decoded instruction is executed, the required data processing operations will be performed with reference to the contents of the identified physical registers.

The decoded instructions, as subjected to renaming by the rename circuitry, are passed to the issue circuitry 40 which in one embodiment can maintain an issue queue of decoded instructions that are awaiting dispatch to the execution circuitry 50. The issue circuitry 40 determines whether operands required for execution of the instructions are available, and issues the instructions for execution when the operands are available. Some example arrangements may support in-order processing so that instructions are issued for execution in an order corresponding to the program order in which instructions were fetched from the level one instruction cache 70, whilst other example arrangements may support out-of-order execution, so that instructions can be issued to the execution circuitry in a different order from the program order. Out-of-order processing can be useful for improving performance because, while an earlier instruction is stalled awaiting operands, a later instruction in the program order whose operands are available can be executed first.

The issue circuitry 40 issues the instructions to the execution circuitry 50 where the instructions are executed to carry out various data processing operations. For example, the execution circuitry may include a number of execution units 52, 54, 56 including an arithmetic/logic unit (ALU) 52 for carrying out arithmetic or logical operations on integer values, a floating-point unit (FPU) 32 for carrying out operations on values represented in floating-point form, and a load/store unit 56 for carrying out load operations to load a data value from a level one (L1) data cache 75 into a register of the register bank 62, or store operations to store a data value from a register of the register bank 62 to the level one data cache 75. It will be appreciated that these are just some examples of the types of execution units which could be provided, and many other kinds could also be provided.

As instructions are dispatched to the execution circuitry 50 by the issue circuitry 40, the required source operands may be retrieved from the register storage 60, and then in due course the results of the executed instructions may be written back to the register storage 60.

As shown in FIG. 1, the L1 instruction cache 70 and the L1 data cache 75 may be part of a cache hierarchy including multiple levels of cache. For example, a level 2 (L2) cache may also be provided, and optionally further levels of cache could also be provided (these further levels of cache being schematically illustrated by the block 80 in FIG. 1). In this example, the L2 and further levels of cache are shared between the L1 instruction cache 70 and the L1 data cache 75, but other examples may have separate L2 instruction and data caches. When an instruction to be fetched is not in the L1 instruction cache 70, then it can be fetched from the L2 cache (or indeed lower levels of cache), and similarly if the instruction is not in those levels of cache it can be fetched from the main memory 85. Similarly, in response to load instructions, data can be fetched from the level 2 or lower levels of cache 80 if it is not in the L1 data cache 75, or can be fetched from memory 85 if required. Any known scheme may be used for managing the cache hierarchy.

As shown in FIG. 1, in addition to the register bank 62 comprising a plurality of physical registers, a register bank cache 64 is provided for caching a subset of the data held in the register bank 62 (the register bank may also be referred to herein as a register file). The processing pipeline can then attempt to access the required data in the register bank cache 64, and only in the event that the data is not in the register bank cache will an access to the register bank 62 be required. This can give rise to significant performance benefits in modern data processing systems, where the size of the register bank 62, and the number of read and write ports provided for the register bank, can cause the access time associated with an access to the register bank to give rise to a significant bottleneck in the processing of instructions. In order to obtain the best performance improvement, it is desirable for the operands required by the processing pipeline to be available in the register bank cache 64 by the time the instructions are ready to be executed by the execution circuitry 50. However, it is also desirable to keep the size of the register bank cache 64 relatively small, so as to increase access performance.

As shown in FIG. 1, prefetch circuitry 110 is provided to seek to prefetch data values from the register bank 62 into the register bank cache 64, with the aim of increasing the likelihood that data values required by the execution circuitry 50 will be present in the register bank cache by the time they are needed by the execution circuitry. The prefetch circuitry 110 can be arranged to receive prefetch requests from a variety of sources, but one particular source is the speculative source operand buffer 105 shown in FIG. 1, that receives an input from operand analysis circuitry 100.

The operand analysis circuitry 100 is arranged to derive source operand information for the instructions fetched from memory, at a point in time well ahead of when those instructions will be ready for execution by the execution circuitry. In particular, the operand analysis circuitry 100 may be arranged so that it derives the source operand information from a fetched instruction before that fetched instruction has been fully decoded, and hence before the execution circuitry can begin execution of that instruction.

In the particular embodiment shown in FIG. 1, as each instruction is added to the instruction buffer 95 by the fetch circuitry 90, the operand analysis circuitry 100 reviews that instruction to seek to determine the source operand information. At this stage, it will not necessarily be clear whether the instruction will in fact in due course be executed, since for example the taken/not taken behaviour of preceding branch instructions will not typically yet be known. However, by analysing the instructions at this early stage, it is possible to provide an early indication of required source operand information, even if that source operand information is somewhat speculative.

There are a number of ways in which the operand analysis circuitry 100 can seek to derive source operand information from the instruction at this early stage. For example, in some architectures some partial decoding of the instruction will occur at this early stage, and may be sufficient to identify the type of instruction. The operand analysis 100 can be arranged to have access to any such partial decode information, so that information can be used when deriving the source operand information. For example, if the type of instruction is known, it may be apparent which bits of the instruction will specify the source operand information, and accordingly those bits can be extracted and analysed in order to determine one or more source operands identified by the instruction.

Alternatively, even if type information is not available for the instruction, some instruction sets may place the source operand information in particular bit fields of the instructions, and accordingly it may be predictable as to which bits of the instruction will represent the source operand information. In such instances, those bits can be analysed in order to derive the source operand information.

The operand analysis circuitry 100 may be arranged to seek to generate speculative source operand information for every instruction added into the instruction buffer, or in an alternative example may decide to preclude certain instructions from that process. For example, if the instruction type information is known then it may be considered appropriate not to output speculative source operand information for certain types of instruction. For example, certain types of instruction may not consume a source operand that is specified with reference to an architectural register, and accordingly when that instruction is executed in due course there will be no need to read a source operand from the register storage 60. Examples of such instructions may be load instructions that load a data value from a memory address into a register, or direct branch instructions that identify the target address without requiring the contents of a source register.

More details of the operation of the operand analysis circuitry 100 will be discussed later with reference to FIG. 2. As each item of source operand information is generated by the operand analysis circuitry 100 it is output into the speculative source operand buffer 105, and the prefetch circuitry 110 is arranged to have access to that buffer. The buffer can be arranged in a variety of ways, and hence in one embodiment may be a simple first-in-first-out (FIFO) buffer so that the contents of the buffer are considered in order by the prefetch circuitry. In other embodiments, the prefetch circuitry may be able to analyse the contents of multiple of the buffer entries at the same time, and hence may not need to process the entries in the order in which they are added by the operand analysis circuitry 100.

The speculative source operand information will in one embodiment identify architectural registers that have been specified by the instructions. As discussed earlier, the rename circuitry 30 is used to map those architectural registers to actual physical registers within the register bank 62. Accordingly, if the prefetch circuitry 110 is to seek to prefetch contents of certain registers into the register bank cache 64, it needs to know which physical registers correspond to the architectural registers at any particular point in time. Accordingly, in one embodiment, as shown in FIG. 1, the rename circuitry 30 has access to the speculative source operand buffer 105, and hence a lookup operation can be triggered within the rename circuitry in order to identify, for each architectural register added in an entry of the buffer 105, the corresponding physical register, with that physical register information then being written back to the entry to provide an updated entry for reference by the prefetch circuitry 110. The prefetch circuitry 110 can then review the contents of one or more active entries within the buffer 105, in order to identify physical registers whose contents should be promoted into the register bank cache 64.

As mentioned earlier, in the illustrated example the speculative source operand information is produced by the operand analysis circuitry 100 at an early stage, prior to an instruction being fully decoded, and prior to it being confirmed whether that instruction will in fact be executed. Hence, in one embodiment, the contents of the buffer 105 can be treated as low priority prefetch requests, and the prefetch circuitry may preferentially process prefetch requests received from other components that are considered to be higher priority. Examples may for example be the rename circuitry 30 and the issue circuitry 40, which may in one embodiment be able to issue prefetch requests to the prefetch circuitry 110, as indicated by the dotted lines in FIG. 1. For example, the rename circuitry 30 may be arranged to output a prefetch request to the prefetch circuitry 110 as it outputs a decoded instruction to the issue circuitry 40. At that point in time, the physical registers associated with the source operands will have been determined, and accordingly such a prefetch request can identify source operands associated with the decoded instruction that is being forwarded to the issue circuitry. Similarly, the issue circuitry 40 may analyse its issue queue and at certain points in time issue prefetch requests to the prefetch circuitry 110, so as to allow those prefetch requests to be processed at a time before an instruction is actually dispatched to the execution circuitry 50.

However, whenever the prefetch circuitry 110 has available resource, it can process the contents of the buffer 105, in order to prefetch contents of certain registers from the register bank 62 into the register bank cache 64, in anticipation of those contents being required in due course when executing instructions within the execution circuitry 50.

Figure 2:
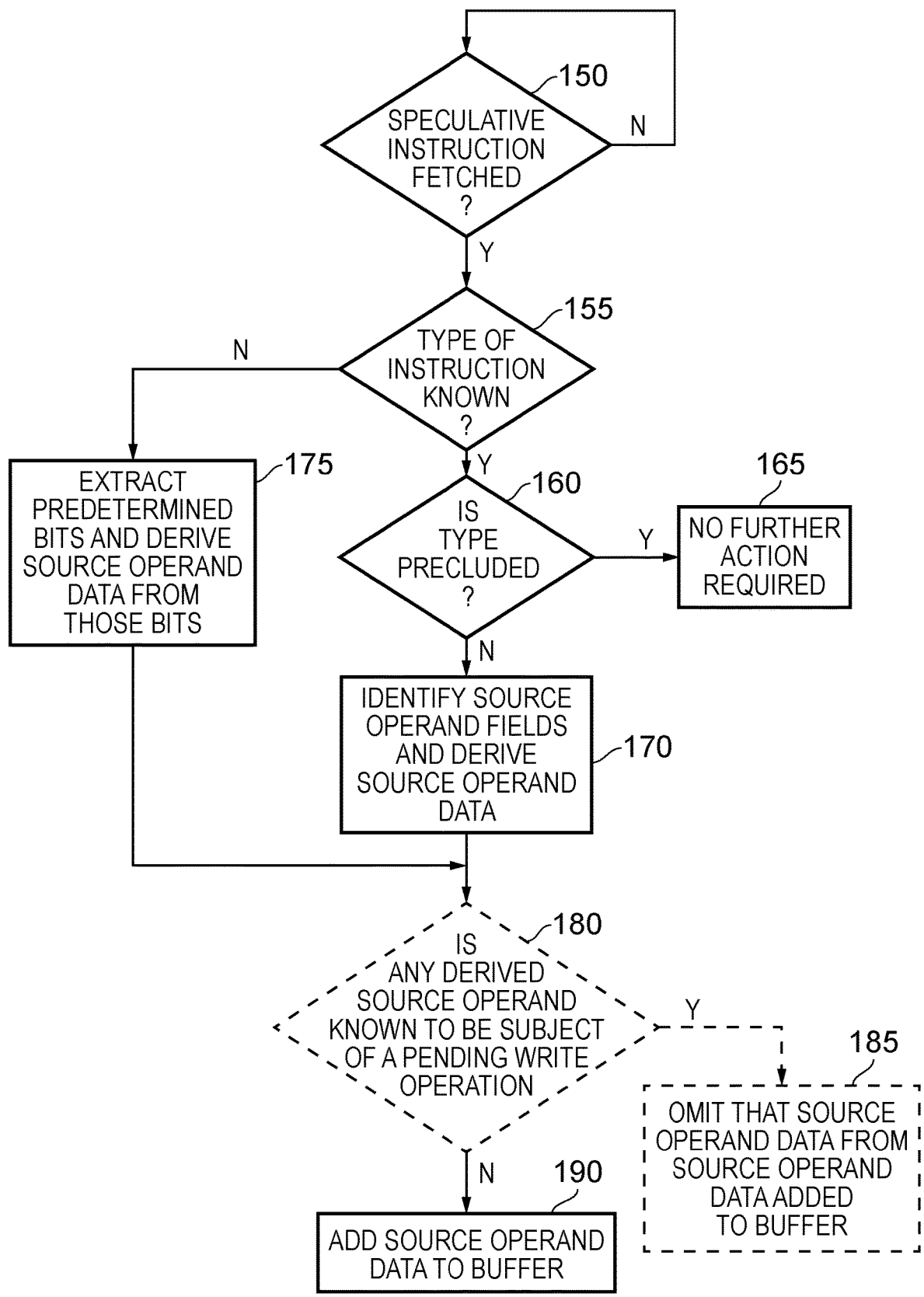
FIG. 2 is a flow diagram illustrating the operation of the operand analysis circuitry of FIG. 1 in accordance with one example.

FIG. 2 is a flow diagram illustrating the operation of the operand analysis circuitry 100 in accordance with one example arrangement. At step 150, it is determined whether a new speculative instruction has been output to the instruction buffer 95, and if so then at step 155 it is determined whether the type of instruction is known. As discussed earlier, this may for example be the case if any preliminary decoding of the instruction takes place within the ISIDE circuitry 10. If so, then it is determined at step 160 whether the instruction is of a type that is precluded from further analysis by the operand analysis circuitry 100, and if so the process proceeds to step 165 where no further action is required.

However, if it is determined that the type of instruction is not precluded from further processing, then at step 170 the operand analysis circuitry identifies the source operand fields for that instruction and derives the source operand data from those identified fields. As discussed earlier, when the type of instruction is available, it will often be the case that the bits that encode the operand information will be known, and accordingly those specific bits can be extracted and analysed at step 170.

However, if at step 155 it is determined that the type of instruction is not known, then it may still be possible to perform some sensible analysis of the source operand information. For example, it may be the case that for at least the vast majority of the instructions in an instruction set, a certain predetermined number of bits are used to specify the source operand information, and accordingly at step 175 those predetermined bits can be extracted and analysed in order to derive the source operand data.

It should be noted that absolute precision is not a requirement at this point, since the main aim of the operand analysis circuitry is to provide some speculative source operand information that can be used by the prefetch circuitry 110 to anticipate at an early stage the likely source operand requirements of the execution circuitry. If the source operand information is not always identified accurately, this is not problematic, since the only result is that the contents of one or more registers in the register bank 62 are unnecessarily prefetched into the register bank cache 64. Such a situation can also arise if the instruction flow does not proceed as expected, and accordingly some prefetching occurs in respect of instructions that are not in due course actually executed. However, assuming that in the majority of cases the instructions are in fact in due course executed, and an accurate assessment can be made of the source operand information for most of those instructions, the above described process employing the buffer 105 and the prefetch circuitry 110 can lead to a significantly increased hit rate within the register bank cache 64 when operands are in due course accessed by the issue circuitry 40 and/or execution circuitry 50.

Following steps 170 or 175, then in one embodiment the derived source operand information can then at that point be added into the buffer 105 at step 190. However, as shown in FIG. 2, in an alternative arrangement, an additional decision step can first be added, as indicated by the box 180. In particular, the ISIDE circuitry 10 may know which architectural destination registers are associated with pending write operations. Then, if any derived source operand information indicates an architectural register to be used as a source operand which it is known is also the destination register for a pending write operation, it may be decided to be inappropriate to place that source operand information into the buffer 105. In particular, this scenario indicates a scenario where the current contents of the relevant physical register within the register bank will not store the information that will actually be required in due course as a source operand for the instruction that is currently being analysed by the operand analysis circuitry, and instead the required data will be the result of a pending instruction that has yet to be executed by the execution circuitry. Hence, in one embodiment it will be considered inappropriate to seek to prefetch into the register bank cache 64 the current contents of the identified source register, and instead as indicated by step 185 in FIG. 2, that source operand data can be omitted from the source operand data that is added to the buffer 105.

Figure 3:
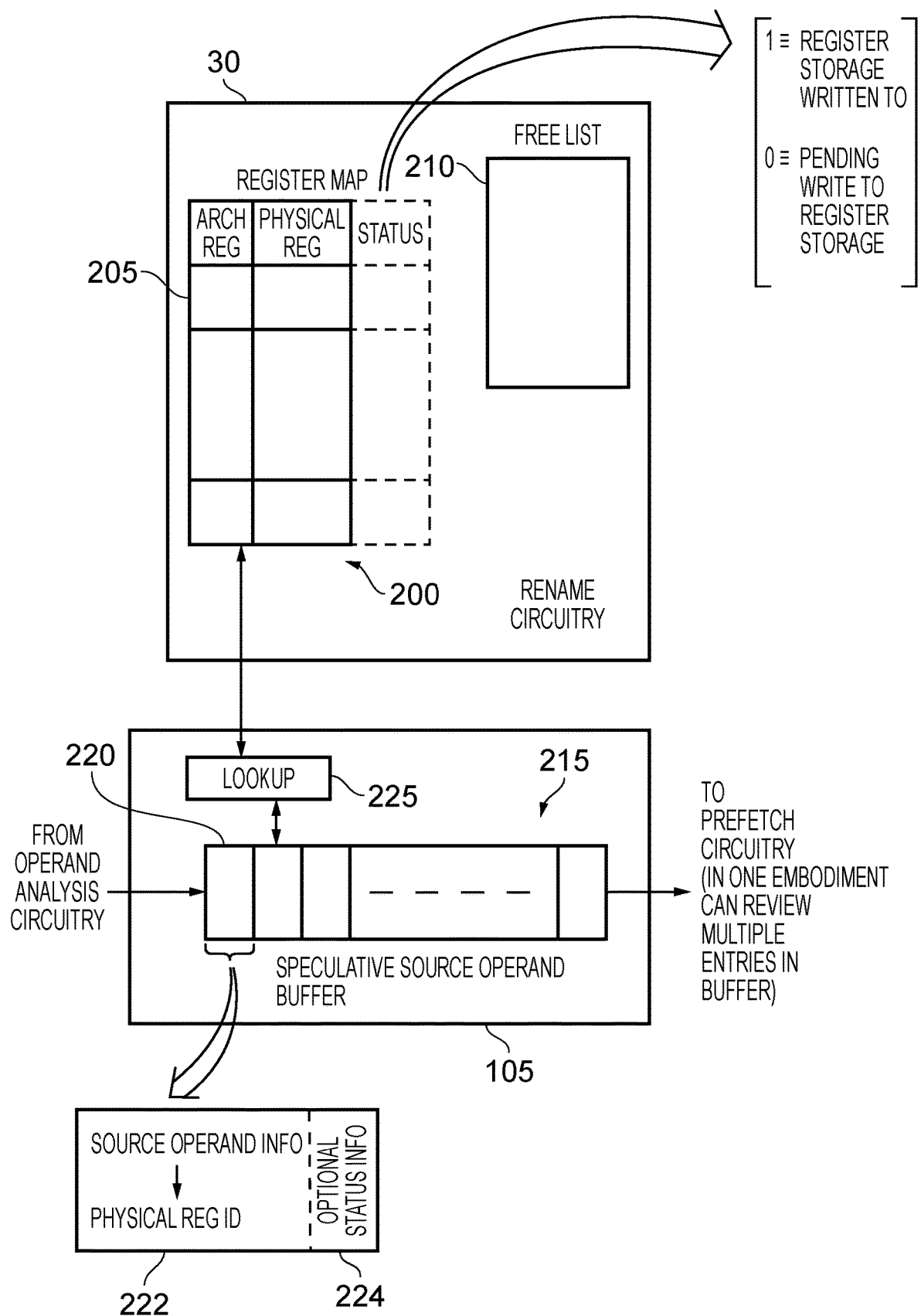
FIG. 3 schematically illustrates interaction between the rename circuitry and the speculative source operand buffer of FIG. 1 in accordance with one example.

FIG. 3 is a diagram schematically illustrating the interaction between the rename circuitry 30 and the speculative source operand buffer 105 in one example arrangement. The speculative source operand buffer 105 comprises buffer storage 215 consisting of a plurality of entries 220. When each entry is populated by the operand analysis circuitry 100, it contains the derived source operand information, which in one embodiment will identify a specific architectural register that the operand analysis circuitry 100 considers will be used as a source operand for an instruction in due course. Lookup circuitry 225 can then be used to trigger a lookup within the rename circuitry 30, and in particular with reference to the register map 200 maintained by the rename circuitry to identify the current correspondence between architectural registers specified by instructions and the physical registers within the register bank 62. In particular, the register map 200 will contain a plurality of entries 205, where each entry identifies a physical register currently corresponding to an architectural register. As will be apparent to those skilled in the art, there will typically be significantly more physical registers than there are architectural registers, and a free list 210 can be maintained within the rename circuitry to identify the currently available physical registers, so that when in due course it is necessary to allocate another physical register to an architectural register, a physical register can be chosen from the free list.

As a result of the lookup operation, the current content of an entry 220 can be updated to replace the derived source operand information output by the operand analysis circuitry with a physical register identifier. In one embodiment, this physical register identifier information can be used to overwrite the original source operand information, since the source operand information does not need to be retained. Hence, a field 222 within an entry 220 can be used initially to store the source operand information, and then in due course to store the physical register identifier determined by the lookup operation with reference to the rename circuitry 30.

In one example arrangement, this is all the information that needs to be retained in each entry of the buffer 105. However, in an alternative example arrangement, some optional status information can also be added in an additional field 224. In particular, for each entry 205 in the register map 200 of the rename circuitry 30, there may be associated status information. This status information may be stored as part of the register map, or may be stored elsewhere within the system, but linked to particular entries in the register map. The status information can for example identify whether the physical register associated with the architectural register currently stores the most up-to-date data destined for that physical register, i.e. there are no pending operations that will write to that physical register as a destination operand. Alternatively the status information may identify that there is at least one pending write operation to that physical register. In one embodiment, that status information can be output as part of the lookup response so that it can be stored in association with each entry within the buffer 105, for later reference by the prefetch circuitry 110. This will be discussed later with reference to FIG. 7.

Figure 4:
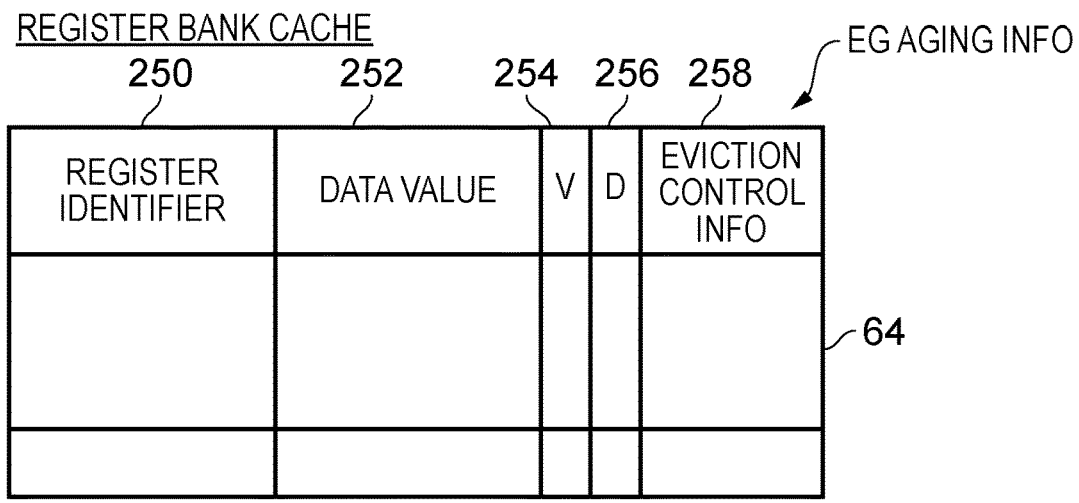
FIG. 4 identifies fields provided within entries of the register bank cache in accordance with one example.

The register bank cache 64 can be arranged in a variety of ways, but one example is as shown in FIG. 4. In particular, each entry within the register bank cache 64 comprises a plurality of fields. The field 250 is used to store a register identifier used to identify the corresponding physical register within the register bank 62 for which that cache entry stores a data value, whilst field 252 is used to store the data value associated with that register. One or more control fields can be used to provide control information, such as the valid field 254 used to identify whether the cache entry is valid or invalid, and the dirty field 256 used to identify whether the current contents stored in that cache entry are more up-to-date than the version held in the identified register. In particular, it is possible that when result data is generated by the execution circuitry, it may be written into the register bank cache without at that time being replicated within the register bank. If so, then the dirty flag will be set to identify that the register bank cache contents are more up-to-date than the contents in the register bank 62. In due course, that data can then be evicted to the register bank, as necessary.

In addition, eviction control information can be maintained in one or more fields 258, and used by control circuitry associated with the register bank cache when deciding which cache entries to evict from the cache in order to make space for new data that needs allocating into the cache. The eviction control information can take a variety of forms, but in one example could be some form of aging information, so that the longer the contents of a cache line are maintained within the register bank cache without being accessed, the more likely they are to be evicted should space be required within the register bank cache to allocate new data.

If desired, certain entries could be aged more quickly than others, if the cache control circuitry has access to contextual information indicative of activities performed during instruction execution. For example, if the content of a particular register bank cache entry is associated with a physical register that has recently been the subject of a store instruction (i.e. the current contents of that physical register have recently been written out to memory), this may imply that it is less likely that that cache entry's contents will be used as a source operand for a subsequent instruction, and accordingly it could be decided to update the eviction control information in the field 258 so as to age that particular entry more quickly than other entries.

Figure 5:
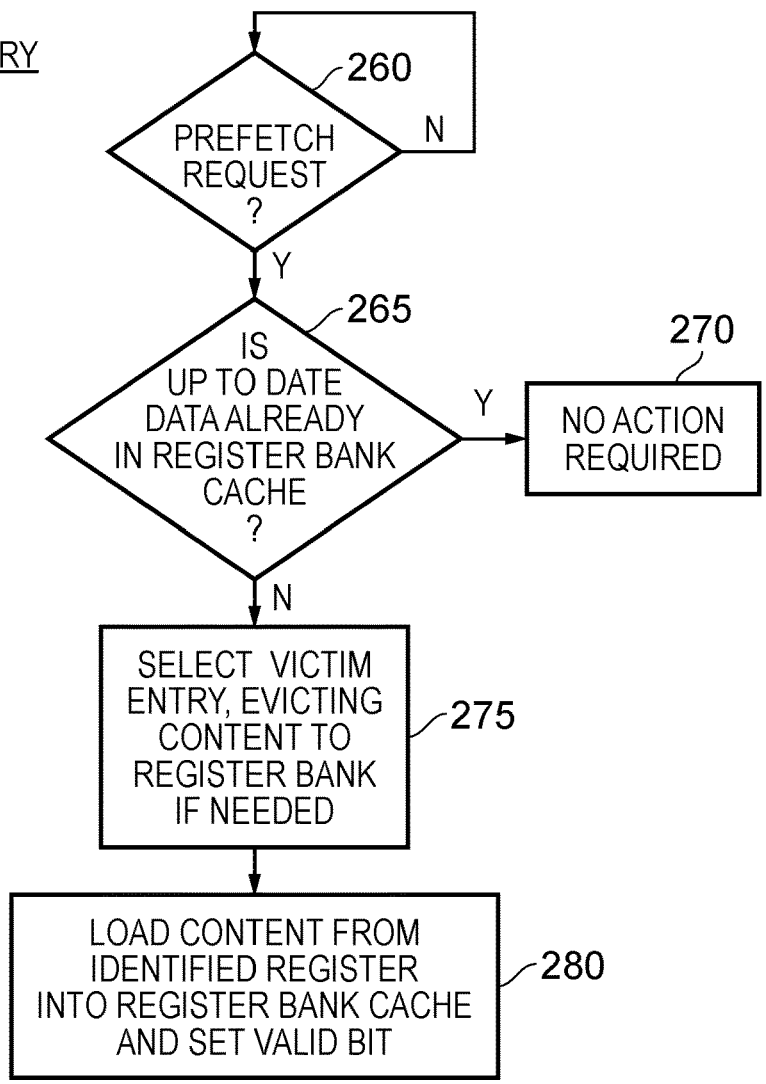
FIG. 5 is a flow diagram illustrating one example of the operation of the prefetch circuitry when processing a prefetch request.

FIG. 5 is a flow diagram illustrating the operation of the prefetch circuitry when handling a prefetch request. As mentioned earlier, the prefetch request may come from a variety of sources, for example the rename circuitry 30, the issue circuitry 40, or one of the entries in the buffer 105. When the prefetch circuitry determines at step 260 to accept a prefetch request, then at step 265 it performs a lookup operation within the register bank cache 64 to check whether up-to-date data for the identified physical register is already held in the register bank cache. If so, then at step 270 it is determined that no further action is required, and that prefetch request is considered to have been processed.

However, if up-to-date data is not already in the register bank cache, then at step 275 a victim entry within the register bank cache is selected, for example with reference to the eviction control information 258 if all of the entries currently contain valid information. However, if any entry does not store valid information, then one of the invalid entries will typically be chosen as a victim entry. Once the victim entry has been selected, then at step 275 the current content of that victim entry is evicted to the register bank cache if needed, in one embodiment this being necessary if the contents of that victim entry are indicated as being both valid and dirty.

Thereafter, at step 280, the content in the register identified by the prefetch request is loaded into the register bank cache, and the valid bit for the relevant entry in the register bank cache is set to identify that the content is valid.

Figure 6:
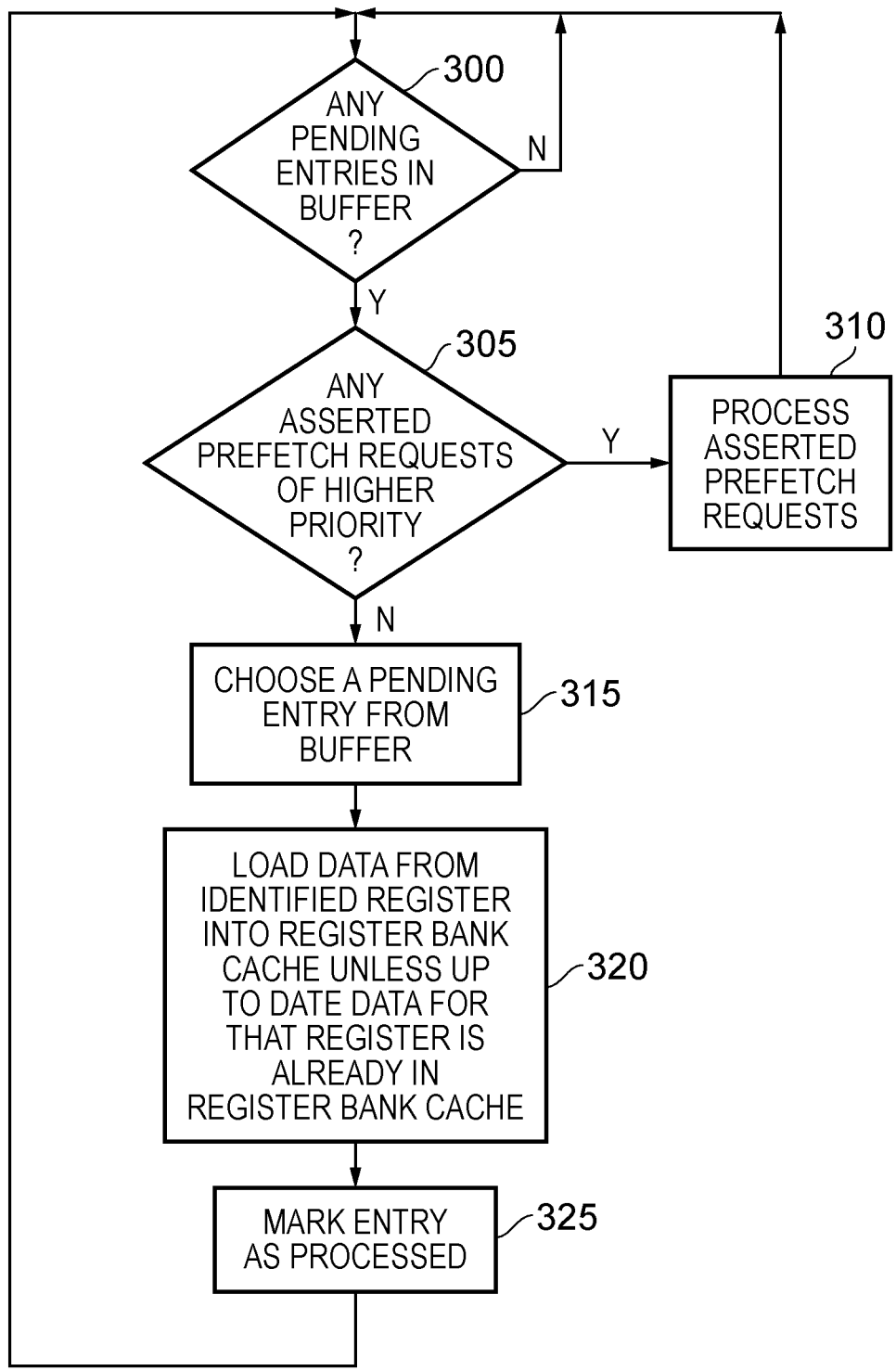
FIG. 6 is a flow diagram illustrating one example of how the prefetch circuitry handles processing of the buffer entries.

FIG. 6 is a flow diagram illustrating in more detail how the prefetch circuitry processes a buffer entry within the buffer 105.

At step 300, the prefetch circuitry determines whether there are any active pending entries in the buffer 105. The active entries can be indicated in a variety of ways, dependent on the format of the buffer. For example, if a FIFO structure is used, control information can be provided to identify whether the FIFO currently contains at least one active entry, and in such situations, the prefetch circuitry will consider the entry at the head of the FIFO. In a circular buffer arrangement, head and tail pointers may be used to identify the active entries within the buffer, there being at least one active entry whenever the head pointer and the tail pointer differ. In a further alternative example, valid bits may be associated with each of the entries, which can be set or cleared to identify whether the entries are active, i.e. contain a physical register identifier to be processed by the prefetch circuitry 110.

When at step 300 it is determined that there is at least one pending entry in the buffer, then at step 305 it is checked whether there are any asserted prefetch requests of higher priority, which as mentioned earlier could for example take the form of prefetch requests issued by the rename circuitry 30 or the issue circuitry 40. If there are any asserted prefetch requests of higher priority, then at step 310 those asserted prefetches are processed first, with the process then returning to step 300.

However, if at step 305 it is determined that there are no currently asserted prefetch requests of higher priority, then at step 315 the prefetch circuitry 110 chooses a pending entry from the buffer 105. There are a number of schemes that could be used to choose one of the active buffer entries, but in one embodiment the oldest entry in the buffer will be selected. The prefetch circuitry may be able to review multiple entries within the buffer, for example to skip empty or invalidated slots within the buffer.

Thereafter, at step 320, the prefetch circuitry loads data from the identified register into the register bank cache, unless it determines that up-to-date data for that register is already stored in the register bank cache. Thereafter, the buffer entry that has been processed is marked as having been processed at step 325. This may involve actively invalidating the entry, or modifying pointers for the buffer so as to exclude the entry that has just been processed from the pending entries. The process then returns to step 300.

Figure 7:
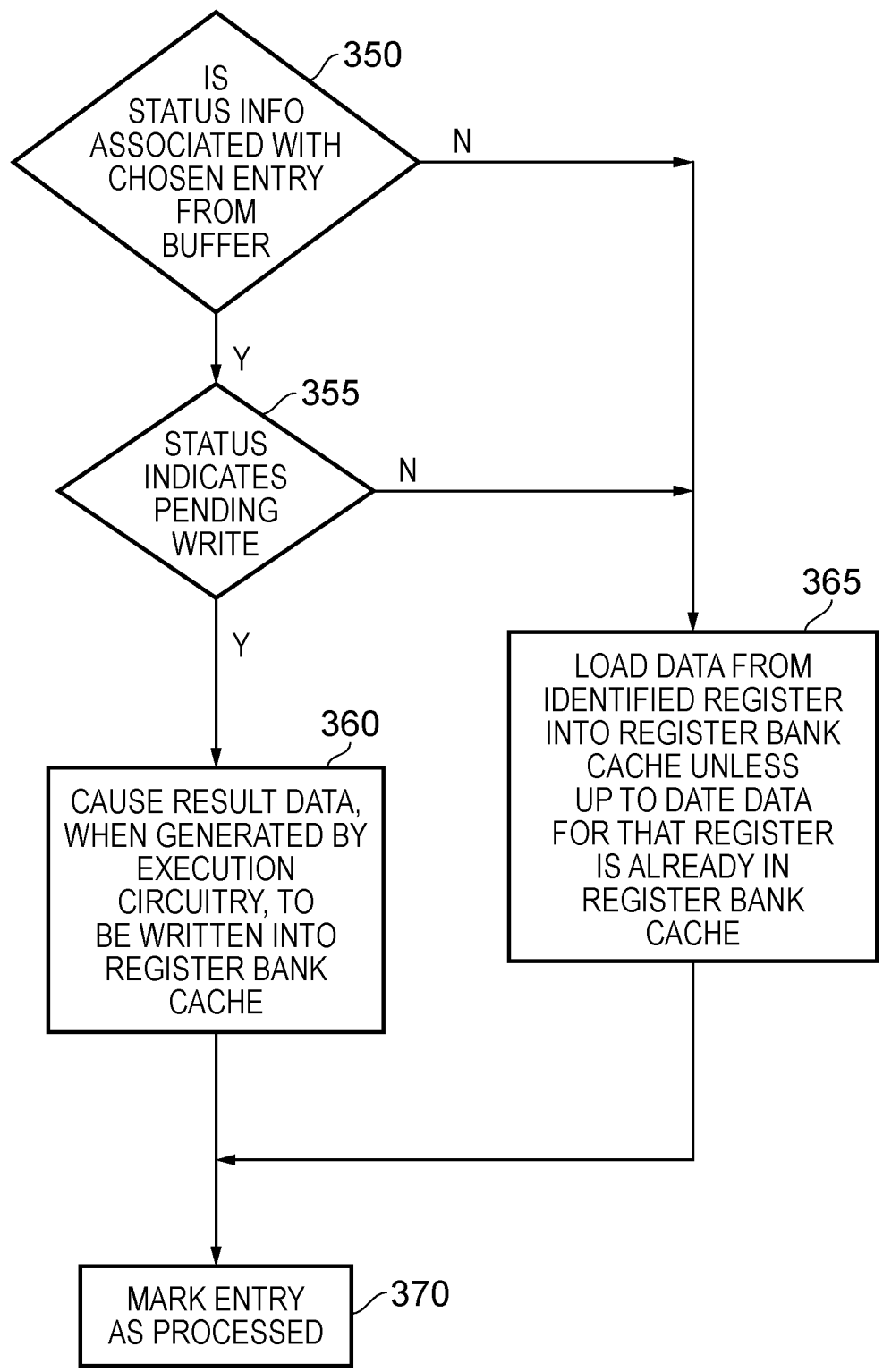
FIG. 7 is a flow diagram illustrating an optional modification for the last two steps of the process of FIG. 6.

FIG. 7 is a flow diagram illustrating an optional modification that can be used to replace steps 320 and 325 in FIG. 6, in situations where the status information discussed earlier with reference to FIG. 3 may be added in association with one or more of the entries. At step 350, it is determined whether the status information is associated with the chosen entry from the buffer, and if not the process proceeds to step 365, which corresponds with the step 320 discussed earlier with reference to FIG. 6. The entry is then marked as processed at step 370, this corresponding to the step 325 discussed earlier with reference to FIG. 6.

However, if there is status information associated with the chosen entry, then the process proceeds to step 355 where it is determined whether that status information indicates that there is a pending write operation to the identified register. If not, then the process proceeds to step 365, but otherwise proceeds to step 360. In particular, if there is a pending write operation, the prefetch circuitry may be arranged to determine that is it not appropriate to prefetch the current contents of the identified register from the register bank 62 into the register bank cache 64. Instead, it may be arranged to use that information to cause the result data, when generated by the execution circuitry 50 for the relevant instruction, to be written directly into the register bank cache 64. As a result, this causes that result data to be present in the register bank cache 64 as soon as it is available. The result data may be written into the register bank cache 64 instead of being written into the destination register of the register bank 62, or alternatively may be written into the register bank cache 64 as well as being written into the destination register of the register bank 62.

Following step 360, the relevant entry is then marked as processed at step 370.

In one embodiment, the status information added into the buffer entries 220 is not updated after the initial lookup into the rename circuitry is performed, and hence may potentially be out-of-date by the time the prefetch circuitry reviews it. However, if it is determined that the result data has already been written into the register bank cache by the time the prefetch circuitry considers the entry, then the prefetch circuitry may determine that no action is needed and just mark the entry as processed.

A similar mechanism could also be applied earlier by the rename circuitry 30. For example, if at the time the lookup is performed in the rename circuitry, it is determined that the result data has already been written into the register bank cache, the relevant entry in the buffer 105 could be invalidated rather than being populated with the relevant physical register identifier.

In an alternative example, the status information could be updated periodically whilst it is retained within the buffer 105 if this was considered beneficial (for example to allow on the fly invalidation of entries that no longer need to be considered by the prefetch circuitry), but this would likely increase the complexity of the interaction between the buffer 105 and the processing pipeline, and that complexity may not be warranted in many situations.

Figure 8:
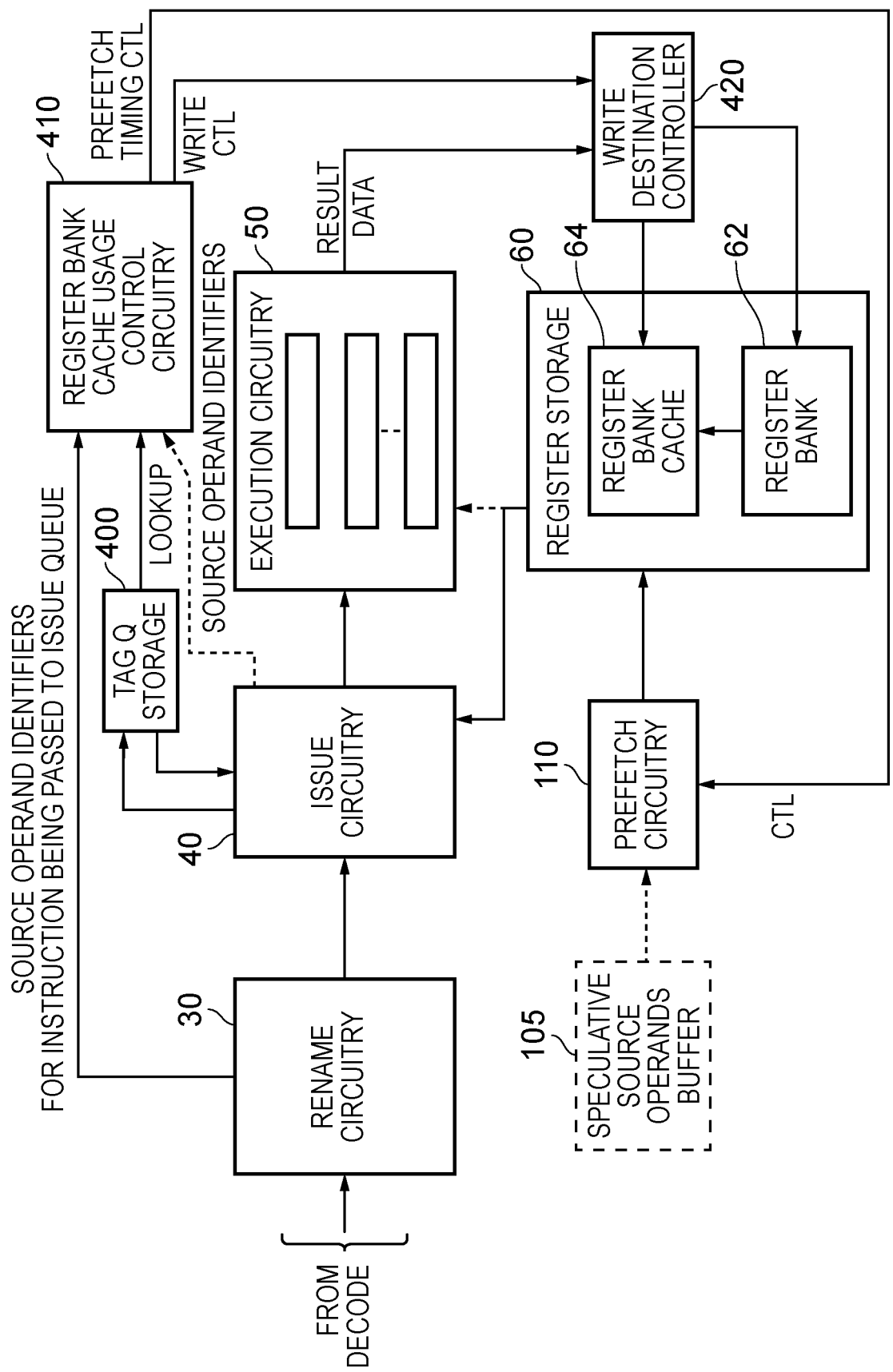
FIG. 8 is a block diagram illustrating a further mechanism that may be used to influence the activities of the prefetch circuitry in one example arrangement.

FIG. 8 schematically illustrates another example mechanism that can be used to control the operations performed by the prefetch circuitry 110. This mechanism may be used instead of, or in addition to, the mechanism described earlier that made use of the speculative source operand buffer 105. As shown in FIG. 8, the circuitry is essentially as discussed earlier with reference to FIG. 1, and may or may not include the operand analysis circuitry 100 and the speculative source operand buffer 105. In addition to the components shown in FIG. 1, the issue circuitry 40 has Tag Q storage 400 associated therewith, and in addition register bank cache usage control circuitry 410 is provided that can issue prefetch timing control information to the prefetch circuitry 110, using a mechanism that will be discussed in more detail later. A write destination controller 420 is also provided for controlling whether the result data output from the execution circuitry 50 is written into the register bank cache 64 or the register bank 62, or indeed whether the result data is written into both the register bank cache and the register bank. The operation of the write destination controller 420 can also be influenced by the register bank usage control circuitry 410, as will be discussed in more detail later.

As each instruction is dispatched from the issue circuitry 40 into one of the execution units of the execution circuitry 50, an entry is added into the Tag Q storage 400. This entry identifies the physical destination register that the result will be written to for that instruction, and also an indication of the number of clock cycles it will take before the result data is available to be written into the destination register. In particular, there will only be a predetermined number of write ports into the register bank 62, or collectively into the register storage 60 if result data can be written directly into the register bank cache 64 instead of the register bank 62. Further, the number of execution units within the execution circuitry may exceed the total number of write ports available. It is important to ensure that the amount of result data produced by the execution circuitry in each clock cycle does not exceed the available bandwidth for writing that result data into the register storage, as dictated by the number of write ports. Hence, before the issue circuitry issues an instruction, it needs to determine how many cycles it will take before the result data will be available, having regard to the particular execution unit to which the instruction is to be dispatched, and then check within the Tag Q storage 400 that there is availability for result data generated at that timing.

Figure 9:
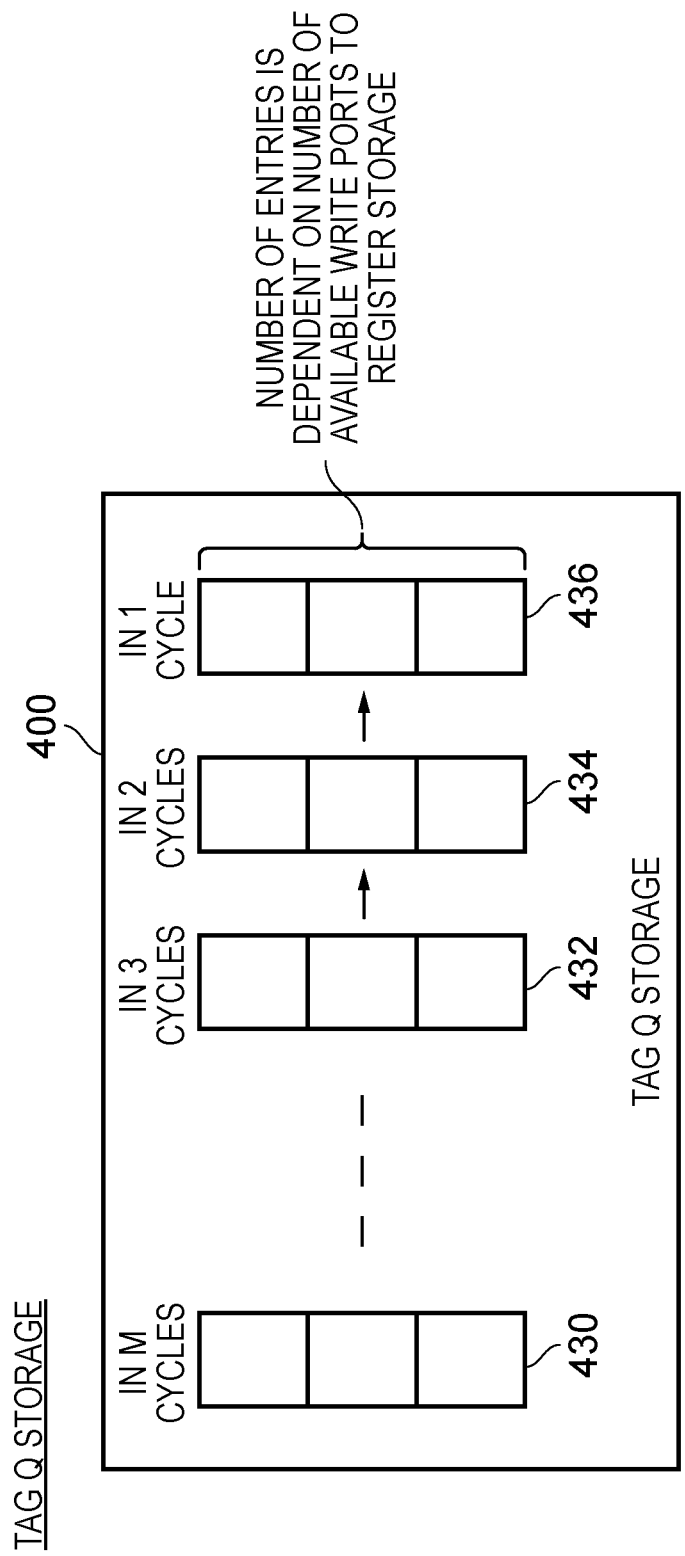
FIG. 9 illustrates in more detail information maintained within the Tag Q storage of FIG. 8 in accordance with one example.

The Tag Q storage can be structured in a variety of ways, but in one embodiment takes the form illustrated in FIG. 9. In particular, a plurality of storage structures 430, 432, 434, 436 can be provided, each having a number of slots equal to the number of available write ports, and each storage structure being associated with a particular clock cycle. As each clock cycle passes, the contents logically move to the adjacent storage structure. In one embodiment this is achieved by migrating the contents of the storage structures, for example using shift circuitry. However, in an alternative embodiment, this could be achieved by varying the clock cycles associated with each storage structure rather than migrating the contents. For example, in one such embodiment the Tag Q storage could be implemented as a circular buffer, with the read pointer shifting with each clock cycle to identify the storage structure whose slots identify physical registers for which results will be produced in the next clock cycle. As each instruction is issued by the issue circuitry, the write pointer can be determined with reference to the read pointer, taking into account the latency of the execution unit to which the instruction is being issued (i.e. the number of clock cycles that execution unit will take to execute the instruction).

Since the issue circuitry knows which execution unit it will issue an instruction to, and knows how many clock cycles each execution unit takes to process an instruction, it will know in how many cycles the result data will become available if that instruction is issued in the current clock cycle. It can hence refer to the appropriate storage structure 430, 432, 434, 436 to check that there is an available slot, and if so can then issue that instruction and write an indication of the destination physical register into the available slot.

In one example arrangement, this structure, which is already provided to ensure there is capacity to write into the register storage the result data produced by the execution circuitry, is also re-used to influence the operations performed by the prefetch circuitry 110, under control of the register bank cache usage control circuitry 410.

In particular, as shown in FIG. 8, as each instruction is passed from the rename circuitry 30 to the issue circuitry 40, an indication of the source operand identifiers for that instruction is passed to the register bank cache usage control circuitry 410. The register bank cache usage control circuitry then performs a lookup within the Tag Q storage 400 to determine whether any of those source operand identifiers (which at this point will identify physical registers within the register bank as determined by the rename circuitry 30) are identified within any of the slots of the Tag Q storage. If they are, then this means that the data value required by that source operand will be produced by the result of an instruction that is already in-flight within the execution circuitry 50. Further, the Tag Q storage information will identify how many clock cycles remain until that result data is available. This can then be used to issue prefetch timing control information to the prefetch circuitry 110 to control the time at which the prefetch circuitry seeks to preload into the register bank cache the data values of the other source operands. By way of specific example, if it is known that one of the source operands will only become available as result data in six cycles time, then that information can be encoded in the prefetch timing control signal, so that the prefetch circuitry 110 does not prefetch the other source operands too early. In one example, an indication of these other source operand registers can be passed to the prefetch circuitry along with the timing control signal.

It is desirable to keep the size of the register bank cache as small as possible, and in order for efficiency to be maintained it is desirable not to prefetch into the register bank cache source operands before they are actually needed, whilst still ensuring that they are available by the time they are needed. In situations where one of the source operands will be provided by the result data from an instruction in-flight, then by the above approach the timing of availability of that result data can be used to influence the time at which the other operands are loaded into the register bank cache by prefetch operations performed by the prefetch circuitry.

In addition, in one embodiment, the write destination controller 420 has the option to write result data either into the register bank cache 64 or into the register bank 62. In situations where the register bank cache usage control circuitry 410 has determined that a result data value will be used as a source operand for a subsequent instruction, it can instruct the write destination controller 420 so as to cause that result data to be written into the register bank cache. In such situations, by using both the write control signal to the write destination controller 420 and the prefetch timing control signal issued to the prefetch circuitry 110, the prefetch operations can be undertaken with the aim of ensuring that all of the required source operand information for a particular instruction becomes available in the register bank cache 64 at approximately the same time.

Figure 10:
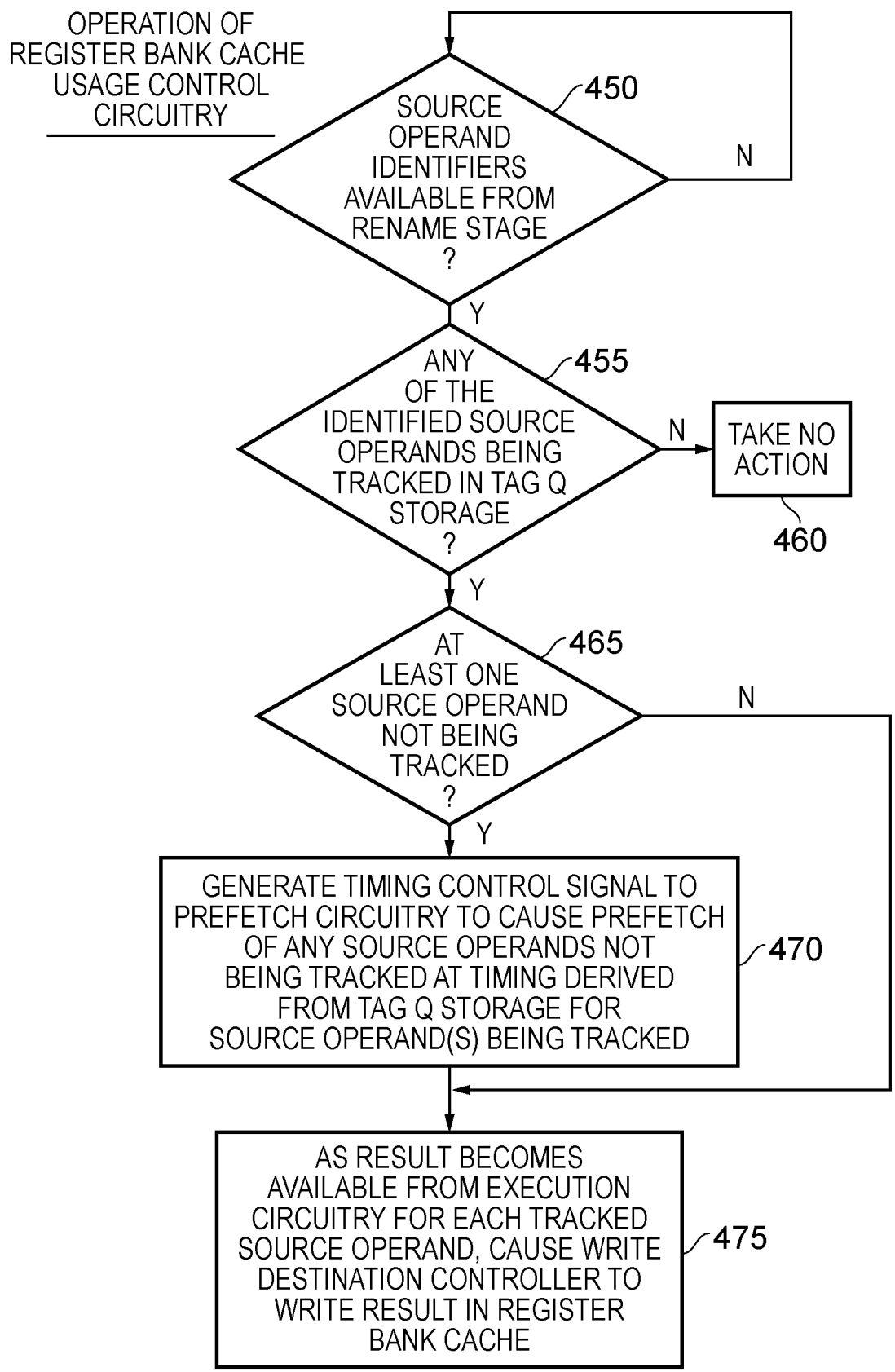
FIG. 10 is a flow diagram illustrating one example of the operation of the register bank cache usage control circuitry of FIG. 8.

This process is illustrated in more detail by the flow diagram of FIG. 10.

At step 450, the register bank cache usage control circuitry 410 determines whether it has received source operand identifiers from the rename stage 30. When that information is provided, it then performs a lookup operation at step 455 to determine whether any of the identified operands are being tracked in the Tag Q storage 400. If not, then in one embodiment it is determined at step 460 that no further action is required by the register bank cache usage control circuitry.

However, where at least one of the identified source operands is being tracked in the Tag Q storage, then at step 465 it is determined whether there is at least one other source operand that is not being tracked.

If that is the case, then at step 470 a timing control signal is generated by the register bank cache usage control circuitry 410 to issue to the prefetch circuitry, and this causes the prefetch circuitry to control the timing of prefetching of any of those source operands not being tracked in the Tag Q storage, using timing derived from the Tag Q storage for the source operand, or source operands, that are being tracked.

In addition to issuing the timing signal at step 470, at step 475 a write control signal is issued from the register bank cache usage control circuitry to the write destination controller 420 so that, as the result becomes available from the execution circuitry for each of the tracked source operands, this causes the write destination controller to write that result into the register bank cache 64, so that it is immediately available for access by the issue circuitry 40 and/or the execution circuitry 50.

In the event that, at step 465, it is determined that all of the source operands associated with the instruction are being tracked, then step 470 becomes unnecessary, and instead the process proceeds directly to step 475.

Figure 11:
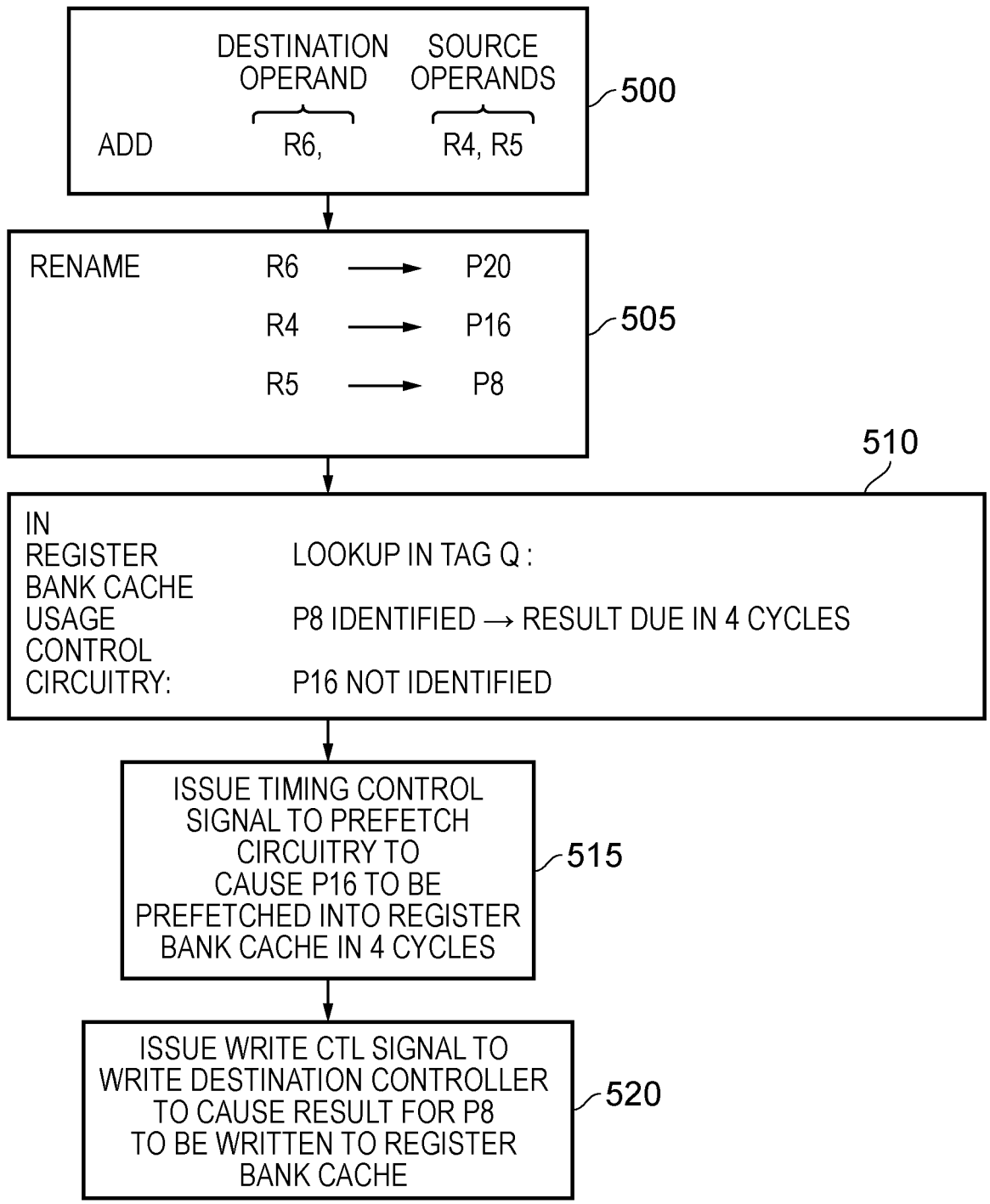
FIG. 11 is a flow diagram schematically illustrating how the timing control information may be utilised to control prefetching in accordance with one specific example.

The above described process is illustrated by way of a specific example with reference to FIG. 11. At step 500, it is assumed that the decoder decodes an add instruction that specifies architectural registers R4 and R5 as source operands and architectural register R6 as a destination operand. Then, in the rename stage it is assumed that the rename circuitry maps R6 to the physical register P20, R4 to the physical register P16 and R5 to the physical register P8 at step 505. As the decoded and renamed instruction is issued to the issue circuitry, a signal is also sent to the register bank cache usage control circuitry 410 identifying that the source operands will be P8 and P16. At step 510, this causes the register bank cache usage control circuitry 410 to perform a lookup in the Tag Q storage 400, and in this example it is assumed that the physical register P8 is already being tracked in one of the slots of the Tag Q storage, whilst the physical register P16 is not. Further, for the physical register P8, the information in the Tag Q storage identifies that the result will be available in four clock cycles.

Using this information, at step 515 the register bank cache usage control circuitry issues a timing control signal to the prefetch circuitry 110 to identify that the physical register P16 should be prefetched into the register bank cache in four cycles time. It will be appreciated that in this embodiment it is determined that the timing control information should directly correspond with the cycle in which the result data is available, but in other embodiments the timing information can be adjusted as desired, for example to cause the prefetch operation to be initiated a cycle or two earlier, or a cycle or two later, as desired. However, essentially the aim is to cause the operations performed by the prefetch circuitry to take into account the availability of the result data for the other source operand, so that the data value in the physical register P16 is not prefetched into the register bank cache too early.

At step 520, the register bank cache usage control circuitry 410 also issues a write control signal to the write destination controller 420, so that when the result data for the physical register P8 does become available, the write destination controller 420 is then primed to write that result into the register bank cache 64. The write destination controller may choose to write the result into the register bank cache 64 without also writing it at the same time into the register bank 62, or alternatively may decide to also store the result in the register bank. The decision taken by the write destination controller in this respect will determine whether the data as stored in the register bank cache is marked as dirty or not.

In one example arrangement, the register bank cache usage control circuitry 410 can also be responsive to source operand information provided directly by the issue circuitry. In particular, when the register bank cache usage control circuitry performs the lookup in the Tag Q storage using the information provided by the rename circuitry, it will only identify situations where one of the source operands is also being used as a destination operand for an instruction that is already in the process of being executed within the execution circuitry 50, but will not detect the situation where there is another pending instruction that will write to that register, but which is still pending within the issue circuitry and has not yet been dispatched to the execution circuitry 50, since for such an instruction there will not yet be any entry in the Tag Q storage 400. As will be described with reference to the flow diagram of FIG. 12, additional functionality added in association with the issue circuitry can be used to detect such situations. In particular, at step 600, the issue circuitry detects when a new instruction is added into its issue queue, and then at step 605 evaluates whether any of the source operands of that new instruction are dependent on the results of another pending instruction that is still retained within the issue queue. If not, it is determined at step 610 that no further action is required.

Figure 12:
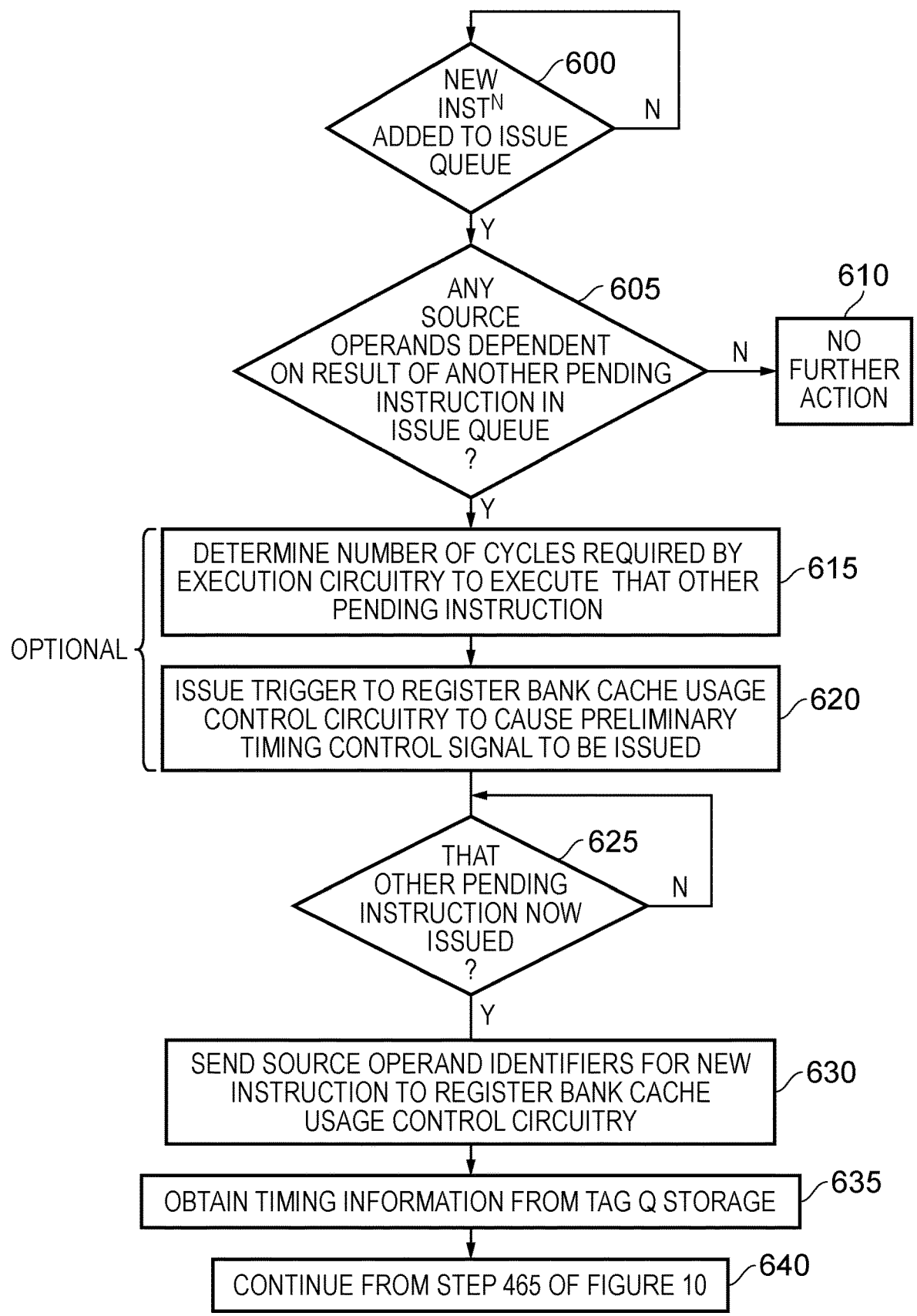
FIG. 12 is a flow diagram illustrating one example of how the issue queue may interact with the register bank cache usage control circuitry.

However, if it is the case that at least one of the source operands of the newly added instruction are dependent on the result of another pending instruction, then the sequence of steps illustrated in the remainder of FIG. 12 may be performed.

Steps 615 and 620 are optional, and in one embodiment can be omitted so that the process proceeds directly to step 625. At step 615, the issue circuitry determines the number of cycles that will be required by the execution circuitry to execute that other pending instruction. In particular, based on the knowledge of the instruction, the issue circuitry can determine which execution unit it will in due course dispatch that instruction to, and will know how many clock cycles that execution unit will take to execute the instruction.

Using that information, the issue circuitry can then issue a trigger to the register bank cache usage control circuitry 410 at step 620 to cause the register bank cache usage control circuitry to issue a preliminary timing control signal to the prefetch circuitry 110. This could for example identify one or more physical registers whose contents should be prefetched to the register bank cache 64, but also identify that those contents will not be required for at least X cycles, where for instance X is determined with reference to the known execution time determined at step 615. In particular, since that other pending instruction has not yet been dispatched, it is known that there will be at least the number of clock cycles associated with the execution of that other pending instruction before its result data will become available, and hence before all of the source operands required for the newly added instruction detected at step 600 need to be available.

Irrespective of whether steps 615 and 620 are performed, at step 625 the issue queue can determine when that other pending instruction has now been issued. Once that other pending instruction is issued, an entry will be made in the Tag Q storage 400, and accordingly at step 630 the source operand identifiers for the new instruction may be sent to the register bank cache usage control circuitry. This will trigger a lookup operation within the Tag Q storage 400 in the same way as discussed earlier with reference to FIG. 10, but in this case it is known that there will be a hit detected, and hence at step 635 the timing information will be obtained from the Tag Q storage for the relevant source operand. From this point, as indicated by step 640, the process can continue from step 465 of FIG. 10.

By such an approach, it will be seen that the timing at which certain source operand data is prefetched from the register bank 62 into the register bank cache 64 can be fine-tuned to take into account the availability of other source operand data, in situations where that other source operand data will be produced by the result of an instruction whose execution has not yet completed. This can enable more efficient use of the available resources within the register bank cache, and potentially enable the size of the register bank cache to be reduced, whilst still giving rise to a high hit rate within the register bank cache 64 when source operands are requested from the register storage 60.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   decode circuitry to decode instructions retrieved from memory;
   execution circuitry to execute the decoded instructions in order to perform operations on data values;
   a register file comprising a plurality of registers to store the data values to be operated on by the execution circuitry;
   a register cache comprising a plurality of entries and arranged to cache a subset of the data values, each entry arranged to cache a data value and an indication of a register of the plurality of registers associated with that cached data value;
   prefetch circuitry to prefetch data values from the register file into the register cache; and
   operand analysis circuitry to derive source operand information for an instruction fetched from the memory, at least prior to the decode circuitry completing decoding of that instruction, and to cause provision to the prefetch circuitry of at least one register identifier determined from said source operand information;
   wherein the prefetch circuitry is arranged to utilise the at least one register identifier when determining which data values to prefetch into the register cache;
   the apparatus further comprising fetch circuitry to speculatively fetch instructions from the memory in anticipation of those instructions being required to be executed by the execution circuitry;
   wherein the operand analysis circuitry is arranged to identify one or more types of instruction among the speculatively fetched instructions and to derive the source operand information for the speculatively fetched instructions of said one or more types.

2. An apparatus as claimed in claim 1, wherein when the execution circuitry is to execute a decoded instruction, the register cache is arranged to perform a lookup operation in response to a register identifier identifying a data value required by the execution circuitry, such that the required data value is retrieved from the register cache rather than the register file when that data value is cached within the register cache.

3. An apparatus as claimed in claim 1, wherein the operand analysis circuitry is arranged, for each of the at least one speculatively fetched instructions, to derive the source operand information from a determined sequence of bits of the speculatively fetched instruction.

4. An apparatus as claimed in claim 1, wherein, unless an override condition exists, the prefetch circuitry is arranged to be responsive to each register identifier provided via the operand analysis circuitry to load into the register cache the data currently stored in the identified register of the register file.

5. An apparatus as claimed in claim 4, wherein said override condition is determined to exist when an entry in the register cache already stores up-to-date data for the identified register.

6. An apparatus as claimed in claim 1, further comprising:
   a buffer provided in association with the operand analysis circuitry to store the register identifiers determined from said source operand information of multiple instructions fetched from the memory; and
   the prefetch circuitry is arranged to access the buffer when determining which data values to prefetch into the register cache.

7. An apparatus comprising:
   decode circuitry to decode instructions retrieved from memory;
   execution circuitry to execute the decoded instructions in order to perform operations on data values;
   a register file comprising a plurality of registers to store the data values to be operated on by the execution circuitry;
   a register cache comprising a plurality of entries and arranged to cache a subset of the data values, each entry arranged to cache a data value and an indication of a register of the plurality of registers associated with that cached data value;

prefetch circuitry to prefetch data values from the register file into the register cache; and operand analysis circuitry to derive source operand information for an instruction fetched from the memory, at least prior to the decode circuitry completing decoding of that instruction, and to cause provision to the prefetch circuitry of at least one register identifier determined from said source operand information;

wherein the prefetch circuitry is arranged to utilise the at least one register identifier when determining which data values to prefetch into the register cache;

wherein, unless an override condition exists, the prefetch circuitry is arranged to be responsive to each register identifier provided via the operand analysis circuitry to load into the register cache the data currently stored in the identified register of the register file; and wherein the prefetch circuitry is arranged to receive a prefetch request from at least one component associated with instruction execution, the override condition being determined to exist when an asserted prefetch request is received from said at least one component, such that the prefetch circuitry processes the asserted prefetch request received from said at least one component in preference to the at least one register identifier provided via the operand analysis circuitry.

8. An apparatus as claimed in claim 7, wherein said at least one component comprises one or more of:

issue circuitry used to maintain a list of decoded instructions awaiting execution by the execution circuitry; and rename circuitry used to map architectural registers specified by instructions to registers within the register file.

9. An apparatus comprising:

decode circuitry to decode instructions retrieved from memory;

execution circuitry to execute the decoded instructions in order to perform operations on data values;

a register file comprising a plurality of registers to store the data values to be operated on by the execution circuitry;

a register cache comprising a plurality of entries and arranged to cache a subset of the data values, each entry arranged to cache a data value and an indication of a register of the plurality of registers associated with that cached data value;

prefetch circuitry to prefetch data values from the register file into the register cache; and operand analysis circuitry to derive source operand information for an instruction fetched from the memory, at least prior to the decode circuitry completing decoding of that instruction, and to cause provision to the prefetch circuitry of at least one register identifier determined from said source operand information;

wherein the prefetch circuitry is arranged to utilise the at least one register identifier when determining which data values to prefetch into the register cache;

wherein the number of registers in the register file exceeds a number of architectural registers specifiable by the instructions, and the apparatus further comprises rename circuitry to map the architectural registers specified by the decoded instructions to registers within the register file, so that when the decoded instructions are executed by the execution circuitry data values are accessed using register identifiers determined by the rename circuitry; and wherein the source operand information derived by the operand analysis circuitry provides an indication of at least one architectural register, and the operand analysis circuitry is arranged to cause the rename circuitry to be referenced in order to determine a corresponding at least one register identifier to be provided to the prefetch circuitry.

10. An apparatus as claimed in claim 9, further comprising: a buffer provided in association with the operand analysis circuitry to store the register identifiers determined from said source operand information of multiple instructions fetched from the memory; and the prefetch circuitry is arranged to access the buffer when determining which data values to prefetch into the register cache;

wherein the operand analysis circuitry is arranged to place the derived source operand information in the buffer, and the rename circuitry is arranged to update the buffer with corresponding register identifiers.

11. An apparatus as claimed in claim 10, wherein on detection of at least one condition, the operand analysis circuitry is arranged to omit storing in the buffer an item of derived source operand information.

12. An apparatus as claimed in claim 11, wherein said at least one condition comprises detection that said item of derived source operand information indicates an architectural register that is specified as a destination operand for a pending write operation.

13. An apparatus as claimed in claim 10, wherein status information is generated for storage in the buffer in association with each register identifier provided by the rename circuitry, and the prefetch circuitry is arranged to reference the status information when determining what action to take in respect of each register identifier in the buffer.

14. An apparatus as claimed in claim 13, wherein when the status information has a first value the prefetch circuitry is arranged, unless an override condition exists, to load into the register cache the data currently stored in the register of the register file that is indicated by the register identifier.

15. An apparatus as claimed in claim 13, wherein when the status information has a second value, the prefetch circuitry is arranged to identify to cache access circuitry that, when the execution circuitry generates a result data value for storing in the register indicated by the register identifier, said result data value is to be stored in the register cache.

16. A method of operating an apparatus having decode circuitry for decoding instructions retrieved from memory, execution circuitry for executing the decoded instructions in order to perform operations on data values, and a register file comprising a plurality of registers to store the data values to be operated on by the execution circuitry, the method comprising:

providing a register cache comprising a plurality of entries and arranged to cache a subset of the data values, each entry arranged to cache a data value and an indication of a register of the plurality of registers associated with that cached data value;

employing prefetch circuitry to prefetch data values from the register file into the register cache;

deriving source operand information for an instruction fetched from the memory, at least prior to the decode circuitry completing decoding of that instruction;

providing to the prefetch circuitry at least one register identifier determined from said source operand information;

causing the prefetch circuitry to utilise the at least one register identifier when determining which data values to prefetch into the register cache;

employing fetch circuitry to speculatively fetch instructions from the memory in anticipation of those instructions being required to be executed by the execution circuitry; and identifying one or more types of instruction among the speculatively fetched instructions and deriving the source operand information for the speculatively fetched instructions of said one or more types.

\* \* \* \* \*